UNITED STATES PATENT OFFICE.

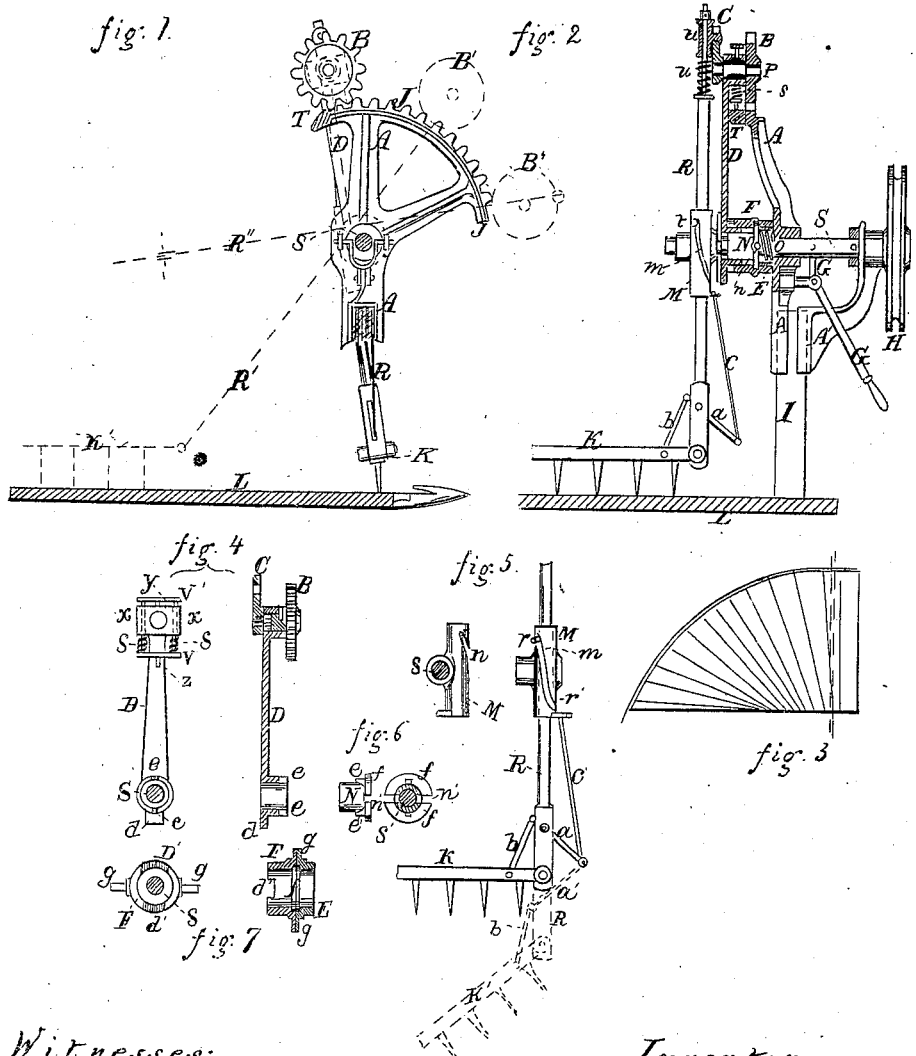

JULIUS WILCKE, OF CHICAGO, ILLINOIS.

IMPROVEMENT IN HARVESTER-RAKES.

Specification forming part of Letters Patent No. 93,260, dated August 3, 1869; antedated July 23, 1869.

*To all whom it may concern:*

Be it known that I, JULIUS WILCKE, of Chicago, in the county of Cook and State of Illinois, have invented a new and useful Improvement in Automatic Rakes for Reaping Machines; and I do declare that the following is a true and accurate description thereof, reference being had to the accompanying drawings, and to the letters of reference marked thereon, and being a part of this specification, in which—

Figure 1 is an elevation of the right side of the apparatus, with the lower part of the standard broken out to show the position of the rake in commencing its sweep. Fig. 2 is a rear elevation of the apparatus, partially in section. Fig. 3 is a plan view of the table, with the varying positions of the rake thereon shown by the lines. Fig. 4 is a side elevation and vertical section of the crank and cranked pinion, showing the position of the stop $y$ when engaged with a recess on the pinion-shaft P. Fig. 5 shows the revolving guide-sleeve M, carrying the rake-rod R, and the method of its operation, the position of the rake when commencing its sweep being shown at K, and when completed, in outline at K'. Fig. 6 is a side and face view of the double clutch N, sliding on the shaft S; and Fig. 7 is a horizontal section of the female reverse-clutch in two sections, E and F, and end view of the F section of the same.

Similar letters refer to corresponding parts in each figure.

The object of this invention is to construct an apparatus which, when sufficient grain to form a sheaf has been cut, and is lying on the rake-table of a reaping-machine, will automatically rake the same to the rear of the table, and deposit it on the ground, ready for binding.

The apparatus is designed to be attached to reaping-machines of the ordinary mode of construction, and be operated by the same.

To accomplish this purpose, upon the corner of the machine, near the rear inner end of the sickle-bar, I erect a post, I, which supports a bracketed standard, A A'. Properly journaled into and passing through the same, is a shaft, S, carrying a pulley, H, driven by a belt or chain from a pulley on a transverse shaft in the reaper proper. The standard A has cast with it a geared segment, J, describing an arc of about forty-five degrees, at one side of the rear end of which is an inclined plane, T. Loosely sleeved on the shaft S is a crank, D, with a lug, $d$, opposite its arm, and whose hub is provided with recesses $e$, Fig. 4. A double reverse-clutch, N, Fig. 6, is also sleeved upon the shaft, having a flange, $f$, recesses $n'\ n'$, and ribs $e'\ e'$, which last engage with the recesses $e\ e$ in the hub of the crank D, to prevent its revolving with the shaft when out of gear.

E F, Fig. 7, form a clutch, embracing and moving the clutch N, by means of its flange $f$ engaging with a recess halved into the flanges of the sections E F, which are held together, and moved back and forth, by links from the clutch-lever G, embracing semicircular studs $g$ on the peripheries of their flanges.

The section F is provided with a transverse slot, $d'$, on its end, which engages with the lug $d$ on the hub of the crank D.

A spiral spring, O, between the standard and the clutch N, prevents its recesses $n'\ n'$ from embracing a pin, $n$, Fig. 2, through the shaft S, except when drawn into gear by the surrounding clutch E F through the clutch-lever G.

Journaled into the upper end of the crank D is a shaft, P, Fig. 2, carrying a pinion, B, and crank C, Fig. 4. The outer end of the crank is formed with a square shoulder on its wrist-end, which has two guide-holes $x\ x$ drilled through it, through which pass rods, connecting the cross-bars $v$ and $v'$, the inner one carrying a stud or lift-pin, $z$, and the outer one a stop-pin, $y$, which is caused to enter a recess in the shaft P by means of the spiral springs $s\ s$, between the bar $v$ and the inner side of the shoulder, preventing the shaft from revolving, except when the crank D in its revolution causes the pin $z$ to be lifted as it passes up the inclined plane T, causing the stop-pin $y$ to be withdrawn from the shaft, which makes one complete revolution through its pinion B engaging with the segment J.

M is a sleeve, cast with a boss on one side, which is transversely bored to receive the shaft S, upon which it revolves, and has a spiral slot, m, in which travels a pin, r, in the rake-rod R, which slides and rotates in the sleeve. This rod is turned smaller at its upper end, to permit its entering and rotating in a sleeve, u, having a crank-pin, which engages with the crank C on the shaft P. This sleeve u is held on the rod by a pin or cap on the end of the same, and between its inner end and the shoulder on the rod (formed by turning it down) is a spiral spring, w, arranged to press the rod down toward the table L while raking.

At the lower end of the rod is hinged a rake, K, which is forced against the surface of the table L by the crank C pressing the sleeve u on the rod against the spiral spring w, and the shoulder at that end of the rod, and the bell-crank lever a b, connected to the flange at the bottom of the sleeve M by the link c.

The rod and rake are compelled to describe a curve, corresponding with that of the table L, by means of the pin r, engaging with the spiral slot m of the sleeve M.

Having thus named the various parts of my invention, I will now explain the method of its operation, premising, however, that it is attached to a reaping-machine in the manner indicated.

The rake K being uppermost, the spring O causes the recess d' in the clutch F to engage with the lug d on the rake-crank D, and holds the same stationary, while the shaft is continually revolved by a belt or endless chain from a transverse shaft in the reaper, acting on the driving-wheel H. Then, perceiving that sufficient grain to form a sheaf has been cut, and is lying on the front of the platform, by means of the clutch-lever G the operator withdraws the clutch F from the stud d on the crank D. At the same time recess n' of the clutch N engages with the pin n on the shaft, when motion is communicated to it and the crank D, the ribs e' e' being but partially withdrawn from the recesses e e in the hub of the crank.

The crank continuing its revolution, the lift-pin z, advancing up the inclined plane T, causes the stop y on the cross-bar v' to be withdrawn from the pinion-shaft P, whose pinion B then engages with the geared segment J, and upon which it makes one revolution with its crank C, which in its first half revolution presses down the rake-rod R through the guide-sleeve M. The pin r in the rod, working in the spiral groove m, causes the rod to make one-fourth of a revolution on its axis, carrying the rake K with it, and which is kept in a horizontal position in its sweep by the bell-crank levers b and a, and the link c, connected to the flange at the lower end of the guide-sleeve M.

The rake having swept the grain off the table, and the pinion B completed its revolution, and passed beyond the segment J, the springs w cause the stop y to enter the recess in the shaft P, which is then held stationary, while in the second half revolution of the crank C the rake-rod R is drawn back up through the guide-sleeve M, while the pin r causes it to rotate back one-fourth of a revolution, when the rake K is again parallel with the cutter-bar at the front of the table, after arriving at a vertical position. At this time the spring O throws the clutch F into gear with it, and holds it fast, while the clutch N is thrown out of gear with the shaft S, which continues to revolve until the operator again finds sufficient grain on the table to form a sheaf, when the operation is repeated.

What I claim as my invention, and desire to secure by Letters Patent, is—

1. The post I, bracketed standard A A', with its geared segment J and inclined plane T, the shaft S and driving-pulley H, crank D, fitted with lug d and recesses e e on its hub, and guide-holes x x on its wrist end, in connection with the bars v v', stop-pin y, lift-pin z, and springs s s, the pinion B, pinion-shaft P, crank C, and crank-sleeve u, substantially as described, and for the purposes set forth.

2. The guide-sleeve M, provided with spiral groove m, the rake K, and rake-rod R, provided with spring w, pin r, and bell-crank levers a and b, and link c, in connection with the flange of the sleeve M, or its equivalent, operating in the manner described, and for the purposes specified.

3. The double clutch N, provided with flange f, ribs e e, and recess n', in connection with the pin n, the sectional clutch E F, provided with semicircular coupling-studs g, and recesses d', clutch-spring O and clutch-lever G, or their equivalents, substantially as described, and operating for the purposes specified.

JULIUS WILCKE.

Witnesses:
H. S. SPRAGUE,
J. W. HOUGHTELIN.